United States Patent
Barkan et al.

(10) Patent No.: US 6,366,575 B1
(45) Date of Patent: *Apr. 2, 2002

(54) EXTENDED ACCESS FOR AUTOMATIC CALL DISTRIBUTING SYSTEM

(75) Inventors: Robert H. Barkan, Bedford; Lawrence J. Draginich, Boxford; Jeffrey A. Fried, Cambridge, all of MA (US)

(73) Assignee: Teloquent Communications Corporation, Billerica, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/740,790

(22) Filed: Nov. 1, 1996

(51) Int. Cl.⁷ .............................................. H04L 12/66
(52) U.S. Cl. .................................... 370/352; 370/395.2
(58) Field of Search ................................ 370/259, 260, 370/261, 270, 271, 352, 353, 354, 355, 356, 360, 410, 395.2, 395.21, 395.52, 401; 379/265, 266, 260, 272, 273, 265.01, 265.02, 265.05, 265.09, 265.11

(56) References Cited

U.S. PATENT DOCUMENTS

| | | |
|---|---|---|
| 5,036,535 A | 7/1991 | Gechter et al. |
| 5,168,515 A | 12/1992 | Gechter et al. |
| 5,271,058 A | 12/1993 | Gechter et al. |
| 5,274,700 A | 12/1993 | Gechter et al. |
| 5,291,492 A | 3/1994 | Andrews et al. |
| 5,299,260 A | 3/1994 | Shaio |
| 5,333,133 A | 7/1994 | Andrews et al. |
| 5,469,504 A | * 11/1995 | Blaha ........................... 379/265 |
| 5,533,115 A | * 7/1996 | Hollenbach et al. ........ 379/220 |

(List continued on next page.)

FOREIGN PATENT DOCUMENTS

| | | |
|---|---|---|
| CA | 2 178 705 A | 3/1997 |
| EP | 0 740 445 A | 10/1996 |

OTHER PUBLICATIONS

G. MacPherson; "Why call Centers Won't Escape the World Wide Web"; Business Communications Review; Jun. 1996; pp. 39–41.
International Search Report dated Jun. 4, 1998.
"Caught Up in the Net", Call Center Magazine, Jun. 1996, pp. 63, 64, 66, 68, 70.
Rockwell Switching Systems Division WEB Page, "Internet ACD A White Paper", 5 pp., copyright 1996.
Rockwell Press Release, Downers Grove, Illinois, 1 pp., copyright 1996.
Rockwell, NetSpeak Ease Net Phoning, Interacive Week, 1 pp., Aug. 26, 1996.
Aspect Telecommunications Press Release, San Jose, California, 4 pp., Aug. 5, 1996.
Aspect Web Page entitled "Comtec Home Page", 4 pp.
AT&T New Release, "Integrated AT&T web and network lets surfers click to talk to a service agent", Parsippany, New Jersey, 5 pp., Aug. 27, 1996.

Primary Examiner—Kwang B. Yao
(74) Attorney, Agent, or Firm—Fish & Richardson P.C.

(57) ABSTRACT

A system for establishing a telephone call between an outside telephone and an agent station, the outside telephone is associated with an outside computer that is connected to a public computer network and is used to request a call with an agent. The request is received at a server connected to the public computer network and is communicated by the server to a call router that is connected to a telephone network and monitors the status of agent stations connected to the telephone network. The call router identifies an available agent station, and signals are sent to establish a telephone call from the outside telephone to the available agent.

48 Claims, 4 Drawing Sheets

U.S. PATENT DOCUMENTS

| | | | | |
|---|---|---|---|---|
| 5,608,786 A | * | 3/1997 | Gordon | 379/100 |
| 5,619,557 A | * | 4/1997 | Van Berkum | 379/88 |
| 5,657,383 A | * | 8/1997 | Gerber et al. | 379/266 |
| 5,778,060 A | * | 7/1998 | Otto | 379/265 |
| 5,799,072 A | * | 8/1998 | Vulcan et al. | 379/114 |
| 5,838,682 A | * | 11/1998 | Dekelbaum et al. | 370/401 |
| 5,848,143 A | * | 12/1998 | Andrews et al. | 379/219 |
| 5,878,130 A | * | 3/1999 | Andrews et al. | 379/265 |
| 5,884,032 A | * | 3/1999 | Bateman et al. | |
| 5,991,394 A | * | 11/1999 | Dezonno et al. | 379/265 |
| 6,130,933 A | * | 10/2000 | Miloslavsky | 379/90.01 |

* cited by examiner

EXTENDED ACCESS FOR AUTOMATIC CALL DISTRIBUTING SYSTEM

BACKGROUND OF THE INVENTION

The invention relates to providing extended access to, an automatic call distributing system.

Automatic call distributing systems (ACDs) are used to distribute incoming telephone calls from outside telephones to available agents.

Example s of ACDs are described in U.S. Pat. Nos. 5,036,535; 5,168,515; 5,271,058; 5,274,700; 5,299,260; 5,291,492; 5,333,133, which are hereby incorporated by reference.

SUMMARY OF THE INVENTION

In one aspect, the invention features, in general, a new way of establishing a telephone call between an outside telephone and an agent station. The outside telephone is associated with an outside computer that is connected to a public computer network and is used to request a call with an agent. The request is received at a server connected to the public computer network and is communicated by the server to a call router device that monitors the status of agent stations connected to a telephone network. The call router identifies an available agent station, and signals are sent to establish a telephone call from the outside telephone to the available agent.

Certain implementations of the invention may include one or more of the following features. In certain implementations, the server sends information regarding the request to the call router for use in selecting an appropriate agent station; such information can include calling line identification, and information entered at the outside computer. The call router is connected to the telephone network and monitors agent status by end-to-end messages sent from the agent stations over the telephone network to the call router. The server sends a dial sequence instruction to the outside computer to dial the available agent station. Alternatively, the server sends an instruction to display a phone number for the available outside agent at the outside computer, and the user establishes the telephone call from the outside telephone to the available agent station. When the agent station receives an indication of an incoming call from an outside telephone, it sends a message to the call router, and the call router sends a message to the agent station authorizing the agent station to receive the call. In some implementations screen sharing is established between the agent station and the outside computer over the public computer network.

In certain implementations, the public computer network is the internet, the outside computer has a web browser, and the server is a web server. The request for a call with an agent is made from a web page. A web page is used to enter form input data sent from the outside computer to the web server and from the web server to the call router.

In certain implementations the outside telephone and the outside computer are connected to the public telephone network via a common modem, and the outside computer is connected to the internet via an internet access provider. In certain other implementations the outside telephone is connected via one line to thepublic telephone network; the outside computer is connected via a modem to another line to the public telephone network, and the outside computer is connected to the internet via an internet access provider. In other implementations the outside telephone is connected via one line to the public telephone network, and the outside computer is connected to the internet via a local area network card.

In certain implementations the telephone network through which the outside telephone and the agent station are connected is the public telephone network. Alternatively the telephone network through which the outside telephone and the agent station are connected includes the internet; the outside telephones are internet phones; and the agent stations have internet phones. In other implementations, the outside telephone or a telephone at the agent station is an internet phone; the other phone is a conventional phone; and the telephone network includes the public telephone network, the internet and a converter device connected between the public telephone network and the internet.

In certain implementations, after an available agent has been identified, the user at the outside telephone is optionally informed of the location (e.g., area code) of the available agent and optionally given a period of time to confirm that a call should be made to the available agent station by entering a control on a graphical user interface. The graphical user interface also includes a cancel button.

In certain implementations there are a plurality of call routers that each have associated agent stations connected to the telephone network, and the request for an available agent is communicated as an offer message to the call routers. After identifying an available agent station to handle the request, a bid message identifying the available agent is sent from one or more of the call routers to the server. The server sends a give message to one of the call routers that have sent a bid message and a cancel message to any other call routers that have sent a bid message.

In certain implementations the agent station is an automated attendant. The call router can additionally identify an alternative non-agent station resource (voice mail post office box or an automated call distributor that is different than the call router), and a telephone call can be established from the outside telephone to the non-agent station resource.

Embodiments of the invention may include one or more of the following advantages. By having the call made from the outside telephone, telephone charges of the business operating the call distributing system are reduced. A single ACD can process both incoming telephone calls and requests made via the internet. Also, a telephone call effectively is in the queue of the ACD before any real telephone call is made, and a call is not made until a ready agent is found, reducing telephone charges for the outside telephone user.

Other advantages and features of the invention will be apparent from the following description of an embodiment thereof and from the claims.

DESCRIPTION OF THE PREFERRED EMBODIMENTS

Figure 1:
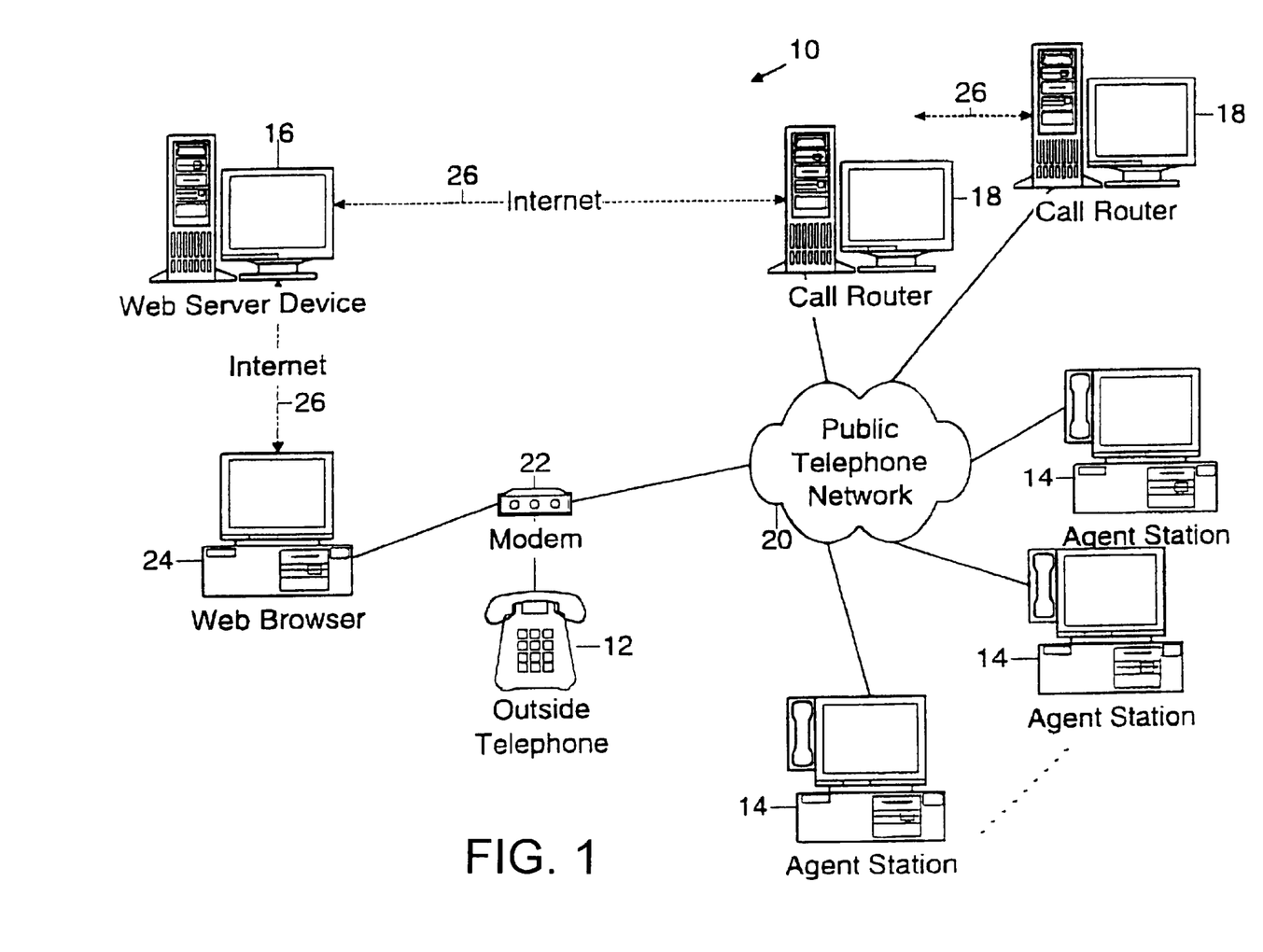
FIG. 1 is a diagram of a system for establishing a telephone call between an outside telephone and an agent station.

Referring to FIG. 1, there is shown system 10 for establishing a telephone call between an outside telephone 12 and an agent station 14. System 10 includes web server device 16, one or more call routers 18, and a plurality of agent stations 14.

Outside Telephone 12 is connected to public telephone network (PTN) 20 via a port to modem 22, which also connects associated personal computer 24 to PTN 20. Computer 24 has software permitting it to operate as a web browser (e.g., available under the Microsoft Internet Explorer Version 3.0 or Netscape Navigator Version 3.0 trade designations or equivalent) on the internet, which is a public computer network and is generally indicated by dashed lines 26 on FIG. 1. Computer 24 is connected to the internet via modem 22, PTN 20, and an internet access provider (not shown on FIG. 1).

Figure 2:
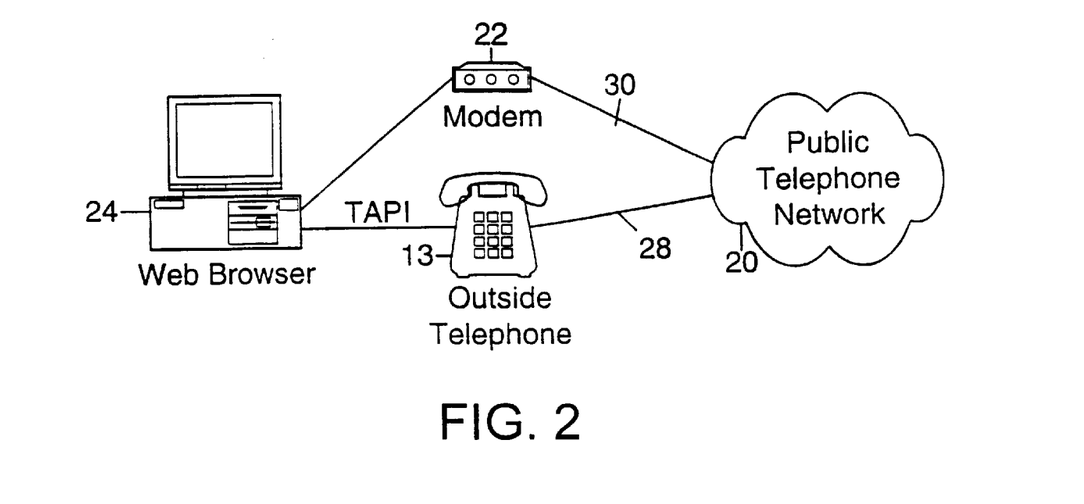
FIGS. 2 and 3 are diagrams showing alternative connection arrangements for the outside telephone and associated computer of the FIG. 1 system.
Figure 3:
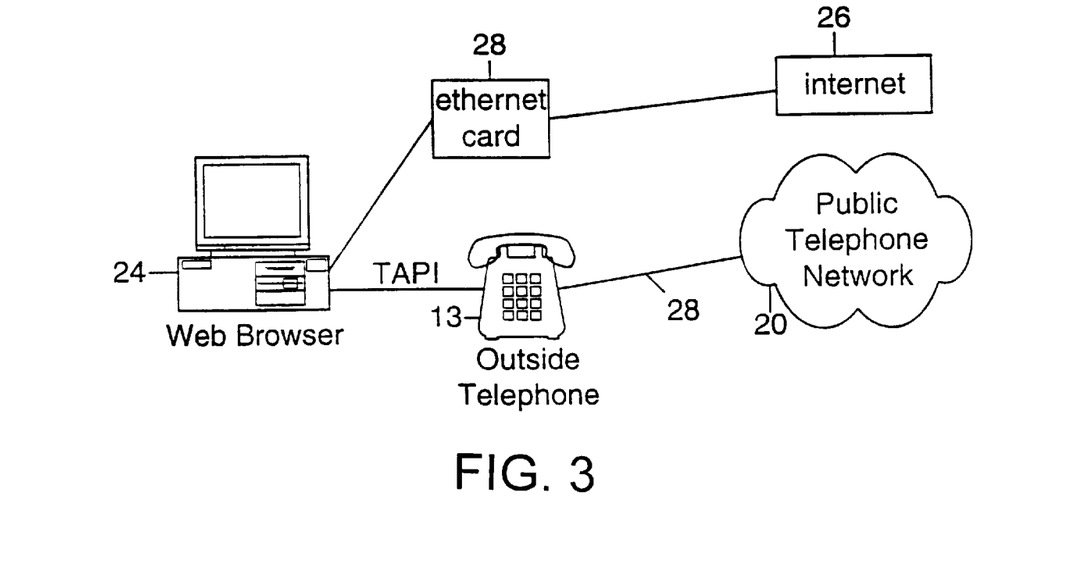

While only one set of an outside telephone 12, associated outside computer 24, and modem 22 are shown on FIG. 1, in point of fact any one of an unlimited number of sets of equipment connected to PTN 20 and internet 26 can access system 10. In addition, the outside telephones and computers 24 might be connected differently, as shown in FIGS. 2 and 3. Referring to FIG. 2, outside telephone 13 is directly connected to PTN 20 via one telephone line 28; associated outside computer 24 is connected via modem 22 to PTN 20 via another telephone line 30 for internet access, and telephone 13 can be controlled by computer 24 by virtue of a software controllable telephone device, e.g., a Microsoft TAPI (telephony application programming interface) compliant device. In the configuration shown in FIG. 3, outside telephone 13 is again under computer control and is directly connected to PTN 20 via telephone line 28, but computer 24 is directly connected to the internet 26 via local area network card 32 (e.g., an ethernet access card available under the 3C590-Combo trade designation from 3Com).

Web server device 16 is implemented by computer (e.g., Pentium based HP NetServer LS with 3Com 3C590-Combo Ethernet card or Compaq Proliant 1500 with SMC 8115 Token Ring card) with a Windows NT Server 4.0 operating system available from Microsoft; this operating system includes Internet Information Server 2.0 (IIS), which provides web server functionality. Alternatively, the web server could be implemented via software available under the Netscape Server trade designation or equivalent. Web server device 16 has direct internet access via an ethernet card or token ring card and employs software to provide hypertext markup language (HTML) web page 34 (see FIG. 4) to web browsers running on outside computers 24 over internet 26 via hypertext transfer protocol (HTTP). Web page 34 includes call-request button 36 used by a person at an outside computer 24 to make a request for a telephone call with an available agent at an agent station 14. (In lieu of button 36, a link or image could also be used to access the call request browser page.) The request could, e.g., be related to sales or service. Web server device 16 also communicates with call router 18 over internet 26 via transmission control protocol (TCP)/internet protocol (IP). When device 16 is powered on, a connection is established for sending messages between web server device 16 and call router 18, and the connection remains up indefinitely. Alternatively, web server device 16 can communicate with call router 18 by a different network connection in order to send the requests for agents to call router 18 and to receive information about an available agent from call router 18. E.g., web server device 16 and call router 18 could communicate with each other via X.25 messages. Web server device 16 also sends signals to outside computer 24 to establish a telephone call from outside telephone 12 to the identified available agent 14, as is discussed in more detail below.

Call router 18 is connected to PTN 20, monitors the status of agent stations 14 via messages received from them, and identifies an available agent 14 in response to a request from web server device 16. Suitable call routers are described in the above-referenced patents. A suitable call router 18 is available from Teloquent Communications Corp. under the PhoneServer trade designation. Call router 18 can be implemented on a Pentium based HP NetServer LS with 3Com 3C590-Combo Ethernet card or Compaq Proliant 1500 with SMC 8115 Token Ring card with an SCO Open Desktop 3.0 UNIX operating system and an ISDN interface card. Alternatively call router 18 and web server device 16 can be implemented on the same platform, though in this case call router 18 would then be NT based. Call router 18 communicates with agent stations 14 via end-to-end X.25 messages provided over PTN 20, which is an integrated services digital network (ISDN). The messages between call router 18 and agent stations 14 could be via different end-to-end messages, e.g., TCP/IP messages over the internet 26. Call router 18 receives agent status messages from agent stations 14 that describe the states of agent stations 14, e.g., busy on a call, idle, doing wrap-up, available for a call. Call router 18 also receives call arrival messages for incoming calls to a central number (or a set of central numbers) and can generate routing signals to cause PTN 20 to transfer the incoming call to an available agent station 14. Agent stations 14 can thus service incoming calls dialed to a central number in addition to calls from outside telephones 12 initiated from a web page on the internet. While only two call routers 18 are shown in FIG. 1, there can be additional call routers 18 that interact with a single web server device 16, each call router 18 having an associated set of agent stations 14 under its control and acting as an autonomous call distribution system.

Computer 24, web server device 16, and call router 18 each include a monitor for display of graphical and textual information and keyboard and mouse input devices (not shown).

Agent stations 14 are described in the above-referenced patents and can include a personal computer and telephone controlled by it.

Figure 4:
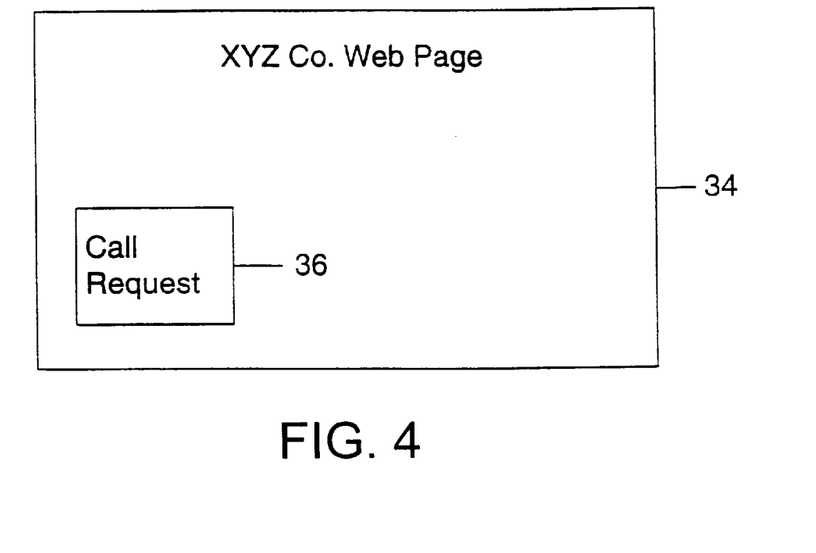
FIG. 4 is a diagram of a web page displayed on a monitor of the associated computer of FIG. 1.
Figure 6:
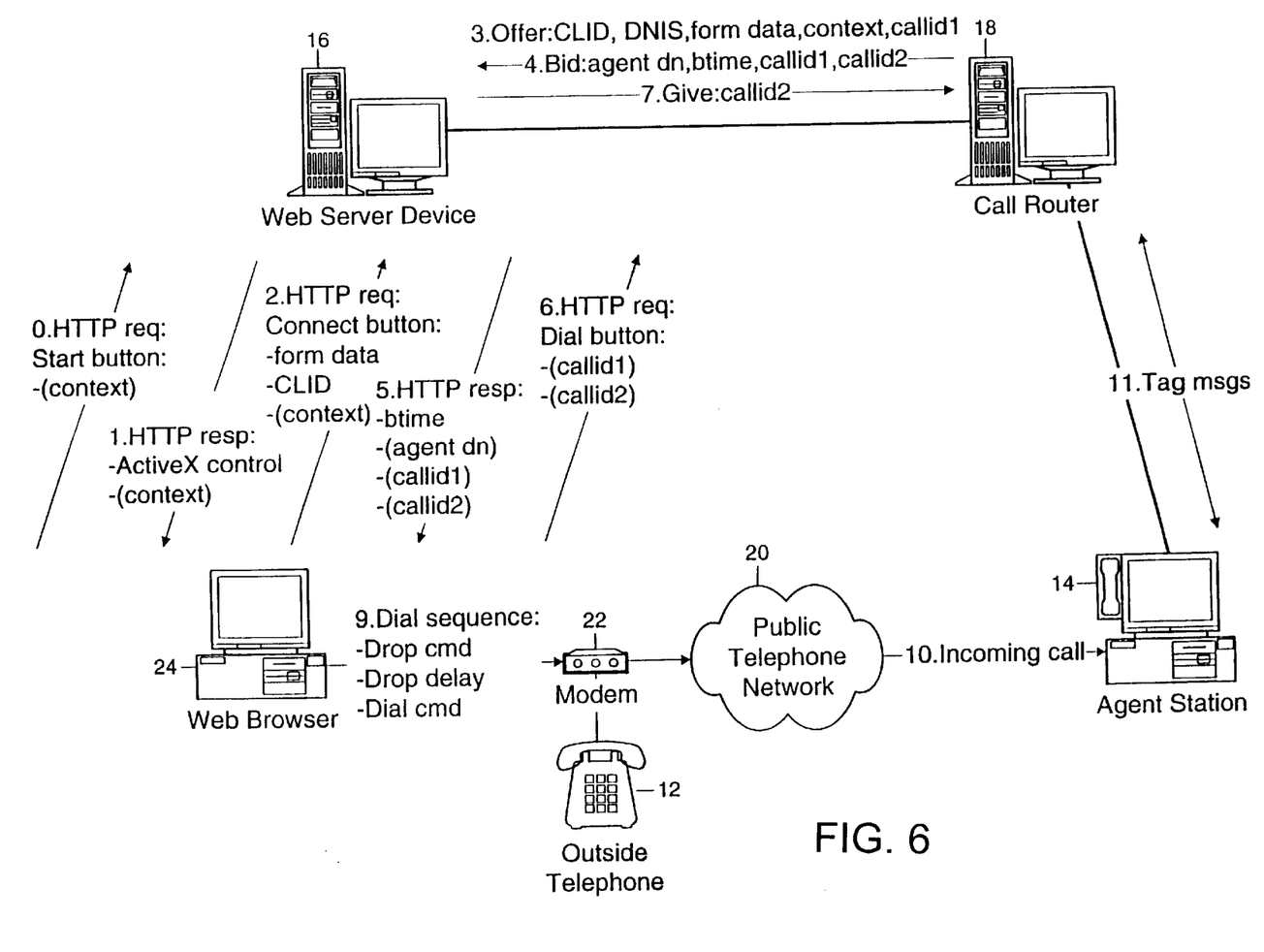
FIG. 6 is a diagram showing a sequence of messages sent between components of the FIG. 1 system.

FIG. 6 describes the messages sent between the various components in order to initiate a call between outside telephone 12 or 13 and an agent station 14 from a request made on a web page, e.g., web page 34 for the XYZ Co. shown on FIG. 4. In this illustration, the XYZ Co. is the business controlling web server device 16, call router 18, and the agent stations 14. The user can arrive at web page by one of a variety of mechanisms, e.g., by typing the Uniform Resource Location (URL) address of the web page or by activating an embedded link in another web page. To initiate the call request process, the user activates call request button 36 on web page 34 shown on FIG. 4. This causes the web browser on computer 24 to send an HTTP message to the web server on web server device 16 to request a call request web page (Step 0 on FIG. 6). In the message at Step 0, "(context)" identifies the web page that the user was on when the message was initiated. The parentheses around "context" and other items on FIG. 6 indicate that the information sent is transparent to the user.

In response, the web server sends the information for a web page via HTTP (Step 1) containing HTML files, graphic and sound files and ActiveX controls (using Microsoft ActiveX interface), all of which are downloaded from the web server device 16 to the web browser at computer 24 in Step 1. The ActiveX controls are used to provide the embedded controls in a web page on computer 24, with the result that a call-request browser page 38 (FIG. 5), created as a spawned process of the web browser, is displayed on the monitor of computer 24. After the download of Activex control, the controls will check the software and/or hardware of the browser computer. These controls will then either determine which method of agent contact is possible based on the available configuration. (I.e., the controls determine whether FIG. 1, 2 or 3 applies or whether there is no telephone under computer control.)

Figure 5:
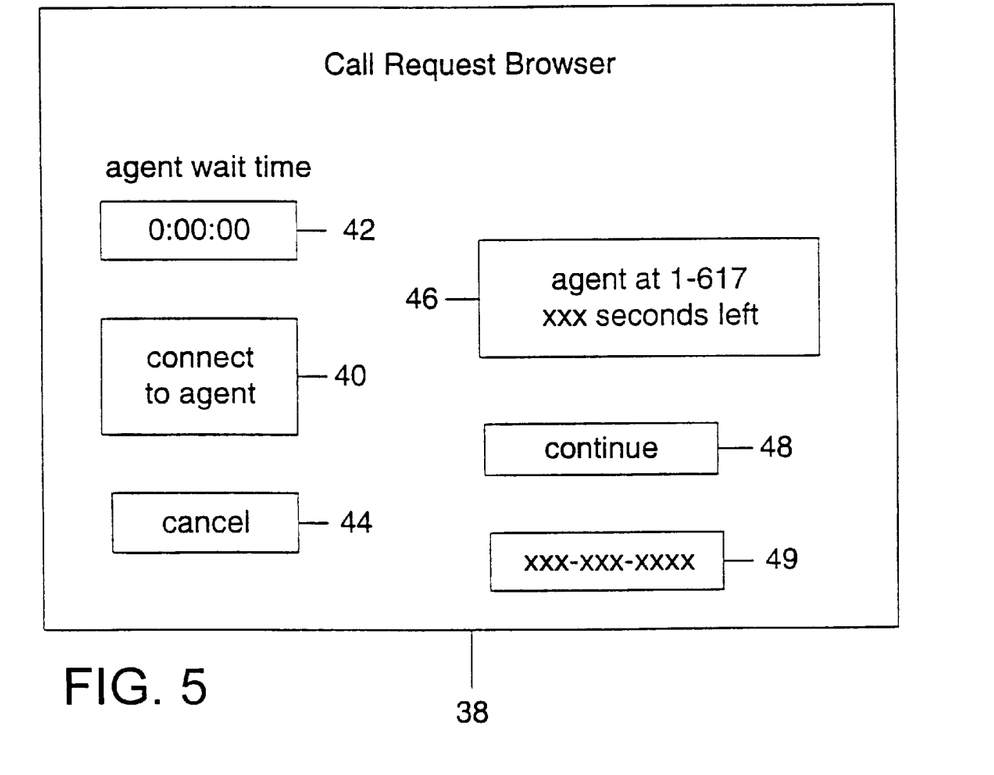
FIG. 5 is a diagram of a call request browser page displayed on a/monitor of the associated computer of FIG. 1.

The example page 38 shown on FIG. 5 includes connect-to-agent button 40, progress indicator 42 (indicating elapsed time since attempting to contact an agent), cancel button 44 (allowing any pending operations to be cancelled at any time), indicator status box 46, continue button 48, and CLID entry box 49. While all of the buttons and boxes 40–49 have been shown on FIG. 6, some of them only appear at certain times in the process. E.g., cancel button 44 does not come on until after the connect-to-agent button 40 has been activated; and connect-to-agent button 40 disappears after it has been activated. If cancel button 44 is activated, connect-to-agent button 40 reappears.

When the user clicks on connect-to-agent button 40, an HTTP message including the calling line identification (CLID), form input data, and context information are then sent to the web server in Step 2. CLID identifies the telephone number of outside telephone 12 or 13; if this information is not stored in computer 24, then this field can be blank or filled in by the user in CLID entry box 49. Form input data include whatever information may be entered on a form (e.g., on web page 38) at the web browser. This information can then be used by call router 18 in assigning an agent. Because call request browser page 38 is contained within a spawned process of the web browser, the browser user can return to surfing the web while waiting for an agent.

In Step 3, an Offer message is sent to call router 18 from the web server. If there are multiple call routers 18, then the Offer message will be sent to all of them. The Offer message includes CLID, dialed number identification service (DNIS), form input data, context and "callid 1." DNIS typically identifies the telephone number to which an incoming call router 18 was dialed and is used by call router 18 in assigning an agent. While there is no dialed number associated with a request for an agent made on a web page, numbers supplied in the DNIS field by the web server are used by routing programs in call router 18 in assigning an agent. "Callid 1" is used by web server device 16 and call router 18 to identify the transaction in subsequent messages. Upon receipt of the Offer message of Step 3, call router 18 reviews agent status tables in an attempt to identify an available agent, placing the request in a queue with other requests for an agent (including those made by incoming calls and those made from a web page) if an agent is not presently available.

When an available agent has been identified, call router 18 sends a Bid message (Step 4), identifying the agent by "agent dn" and indicating bid time "btime", callid 1 and callid 2 to the web server. "Agent dn" is the phone number of the agent. "Callid 2" is a reference generated by call router 18 to uniquely identify the transaction and distinguish it from other transactions, and the bid time indicates how long in seconds the "bid" will remain valid. Because there may be more than one call router 18 responding with an available agent, the response comes in the form a "bid" that can be accepted. During the bid time, e.g., two minutes, the identified agent at an agent station 14 will not accept any other calls.

The web server then sends the information to the web browser in Step 5, and an audible wave file alerts the browser user along with a visual indication on call-request browser page 38 in indicator status box 46 (FIG. 5). The message indicates the telephone area code for the located agent, and how much time the agent will be held for a call from the browser user, i.e., the bid time, which counts down to zero. The browser user can thus decide whether to make a call that potentially may be costly. Indicator status box 46 is optional, could include only one of the two items displayed, and could simply be replaced with a box that informs the user that an agent has been located and asks if the user wishes to proceed. If an indicator status box 46 is not used, the computer will automatically dial the agent.

The user indicates a desire to continue by clicking on continue button 48; an HTTP message to that effect is sent to the web server in Step 6, and, in Step 7, a Give message is sent to call router 18, indicating that the bid has been accepted, and then the call is being given to the identified agent station. If other call routers 18 had also bid on the call, then they will receive Cancel messages at the same time, freeing up the agent stations that had been identified. If the user at the web browser activates the cancel button 44 at any time, then Cancel messages are sent to all call routers 18 that had received Offer messages.

Upon receiving the HTTP message of Step 6, the web server then sends a dial sequence instruction to computer 24 in Step 8. The dial sequence instruction causes computer 24 to drop the internet connection, to connect telephone 12 to PTN 20 (for the FIG. 1 user setup only), and to dial the identified agent station 14, and to instruct the user to pick up the hand set of telephone 12 (for all user setups) in Step 9. The instructions for actually causing the computer to dial the outgoing call to the agent station are provided as part of the ActiveX controls. If the associated outside telephone cannot be controlled by the outside computer, the outside computer displays the agent station's phone number, and the user is instructed to manually dial the agent station.

The incoming call comes in to the identified agent station 14 at Step 10; agent station 14 informs call router 18 of the call (including the CLID for the outside telephone), and call router 18 sends a message to agent station authorizing agent station 14 to receive the call, causing the call to ring at the agent station. Call router 18 also sends information to agent station 14 about the incoming call that had been received in the messages from web server 16 and other information that may have been stored with respect to the particular account. In addition, the data received at the call router 18 regarding the request at the outside telephone or an incoming call can be used at a separate application at the agent station using the agent device API. E.g., the data can be used to-drive a duplication of the caller's web browser page or other page.

All messages sent over internet 26 comply with internet protocol (IP). The various languages and network protocols noted above or elsewhere herein are defined by the Internet Engineering Task Force (IETF) in the following Requests for Comments (RFCs), which are periodically updated by the IETF:

| Protocol | RFC |
|----------|------|
| HTML | 1866 |
| HTTP | 1945 |
| IP | 791 |
| TCP | 793 |

Other Embodiments

Other embodiments of the invention are within the scope of the claims. For example, in addition to the public telephone network, other telephone networks or combinations of telephone networks can be used for telephone calls between outside telephones and agent stations. E.g., the entire system could be used on a private telephone network. Also, the telephone calls could be made as voice communications via internet so long as the outside "telephones" and agent stations had internet phone functionality. In this case the outside telephones would be internet phones, e.g., implemented with a microphone, sound card, and Microsoft Conferencing API for Windows; the "telephone network" would be the internet as accessed by the internet phones, and the "telephone call" would be a voice call over the internet. As a modification, the agent or the outside telephone could be a voice telephone and the other device could be an internet phone; in this case an intermediate converter device, e.g., maintained at the business implementing the call router, receives the internet phone telephone call and converts it to a conventional telephone call to the conventional telephone. The Microsoft Conferencing API for Windows also permits an agent station and a computer at an outside telephone to do screen sharing (so that the agent at the agent station can see what is on the outside computer's screen), or implement a "white board" (permitting the user and agent to enter information into a box displayed on monitors of both computers).

Also, agents could communicate with the call router over the internet and communicate with conventional outside telephones via conventional telephones.

Where there is only a single call router, there would not be any need for the three message sequence of offer, bid, and give, and the give message could be eliminated. Thus the call router would either accept the request for an agent with a bid, or inform the web server that it was unable to locate an available agent with a "no-bid" message.

In addition to an agent telephone number (agent dn), the call router could identify another number for use by the outside telephone. E.g., if there were no available agents or if alternative processing otherwise made sense, the phone number delivered could cause a call to voice mail, an automated attendant, or another automatic call distributing system.

What is claimed is:

1. A method of establishing a telephone call between an outside telephone and an agent station comprising
    making a request for a telephone call with an agent station, said request being made at an outside computer that is associated with said outside telephone and is connected to a public computer network,
    receiving said request at a server connected to said public computer network-and communicating said request to a call router that monitors the status of agent stations connected to a telephone network,
    identifying, after said receiving and prior to initiating a call from said outside telephone, an available agent station at said call router, and
    initiating and establishing, after said identifying, a telephone connection from said outside telephone directly to said available agent station over said telephone network so that said connection is external of said call router.

2. The method of claim 1 wherein said server sends a dial sequence instruction to said outside computer to dial said available agent station.

3. The method of claim 1 wherein said server sends an instruction to display a phone number for said available outside agent at said outside computer, and said user establishes said telephone call from said outside telephone to said available agent station.

4. The method of claim 1 wherein said call router is connected to said telephone network and monitors the status of said agent stations via end-to-end messages sent over said telephone network.

5. The method of claim 1 wherein said server sends information regarding the request to said call router for use in selecting an appropriate agent station.

6. The method of claim 5 wherein said information regarding the request includes CLID.

7. The method of claim 5 wherein said information regarding the request includes information entered at said outside computer.

8. The method of claim 1 wherein said public computer network is the internet, said outside computer has a web browser, and said server is a web server.

9. The method of claim 8 wherein said request is made from a web page.

10. The method of claim 9 wherein said web page is used to enter form input data sent from said outside computer to said web server and from said web server to said call router, said call router using said form input data in selecting an appropriate agent station.

11. The method of claim 1 wherein said telephone network is a public telephone network, and said outside telephone is a conventional telephone, and said agent station has a conventional telephone.

12. The method of claim 1 wherein said telephone network includes the internet, said outside telephones are internet phones, and said agent stations have internet phones.

13. The method of claim 1 wherein said outside telephone or a telephone at said agent station is an internet phone, and the other phone is a conventional phone, and wherein said telephone network includes the public telephone network, the internet and a converter device connected between the public telephone network and the internet.

14. The method of claim 11 wherein said outside telephone and said outside computer are connected to the public telephone network via a common modem, and said outside computer is connected to said internet via an internet access provider.

15. The method of claim 11 wherein said outside telephone is connected via one line to said public telephone network, said outside computer is connected via a modem to another line to said public telephone network, and said outside computer is connected to said internet via an internet access provider.

16. The method of claim 11 wherein said outside telephone is connected via one line to said public telephone network, and said outside computer is connected to the internet via a local area network card.

17. The method of claim 1 wherein, after said identifying, said outside computer receives a message indicating time remaining for the user at the outside computer to confirm that a call should be made to the available agent station.

18. The method of claim 17 wherein, after said identifying, said outside computer receives a message indicating the location of said available agent station and displays the location.

19. The method of claim 18 wherein said computer includes a graphical user interface for entering a confirmation to continue with the request for a telephone call with an agent station.

20. The method of claim 1 wherein said call router also receives incoming telephone calls and identifies available agent stations for handling the incoming telephone calls.

21. The method of claim 1 further comprising establishing screen sharing between said agent station and said outside computer over the internet.

22. The method of claim 1 wherein there are a plurality of call routers that each have associated agent stations connected to said telephone network, and wherein said request for an available agent is communicated as an offer message to said plurality of call routers.

23. The method of claim 22 further comprising sending a bid message from one or more of said call routers to said server after identifying an available agent station, each said bid message identifying an available agent to handle said request.

24. The method of claim 23 wherein said server sends a give message to one of said call routers that have sent a bid message and a cancel message to any other call routers that have sent a bid message.

25. The method of claim 1 wherein said available agent station sends a message to said call router indicating that a call is coming in from said outside telephone, and said call router sends a message to said agent station authorizing said agent station to receive said call.

26. The method of claim 1 wherein said agent station is an automated attendant.

27. The method of claim 1 further comprising identifying an alternative non-agent station resource to handle a further request for a telephone call with an agent station, and establishing a telephone call from said outside telephone to a said non-agent station resource.

28. The method of claim 27 wherein said non-agent station resource is a member of the group consisting of a voice mail post office box and an automated call distributor that is different than said call router.

29. Apparatus for establishing a telephone call between an outside telephone and an agent station connected to a telephone network, said outside telephone being associated with an outside computer connected to a public computer network, comprising
  a call router that monitors the status of agent stations connected to said telephone network, and identifies an available agent in response to a request for an available agent, and
  a server that is connected to said public computer network, receives requests for a telephone call with an agent station from said outside computer, communicates said requests to said call router, thereafter receives an identification of an available agent from said call router prior to initiating a call from said outside telephone, and thereafter sends signals to said outside computer permitting a telephone connection to be initiated and established directly from said outside telephone to said available agent so that said connection is external of said call router.

30. The apparatus of claim 29 wherein said signals are a dial sequence instruction to said outside computer to dial said available agent station.

31. The apparatus of claim 29 wherein said signals are an instruction to display a phone number for said available outside agent at said outside computer.

32. The apparatus of claim 29 wherein said server sends information regarding the request to said call router for use in selecting an appropriate agent station.

33. The apparatus of claim 32 wherein said information regarding the request includes CLID.

34. The apparatus of claim 29 wherein said call router is connected to said telephone network and monitors the status of said agent stations via end-to-end-messages sent over said telephone network.

35. The apparatus of claim 29 wherein said public computer network is the internet, said outside computer has a web browser, and said server is a web server.

36. The apparatus of claim 35 wherein a web page at said outside computer is used to enter form input data sent to said web server and from said web server to said call router, said call router using said form input data in selecting an appropriate agent station.

37. The apparatus of claim 29 wherein said telephone network is a public telephone network, and said outside telephone is a conventional telephone, and said agent station has a conventional telephone.

38. The apparatus of claim 29 wherein said telephone network includes the internet, said outside telephones are internet phones, and said agent stations have internet phones.

39. The apparatus of claim 29 wherein said outside telephone or a telephone at said agent station is an internet phone, and the other phone is a conventional phone, and wherein said telephone network includes the public telephone network, the internet, and a converter device connected between the public telephone network and the internet.

40. The apparatus of claim 29 wherein, after an available agent has been identified, said server sends a message indicating time remaining for the user at the outside computer to confirm that a call should be made to the available agent station.

41. The apparatus of claim 40 wherein, after an available agent has been identified, said server sends a message to said outside computer indicating the location of said available agent station.

42. The apparatus of claim 29 wherein said call router is adapted to also receive incoming telephone calls and identify available agent stations for handling the incoming telephone calls.

43. The apparatus of claim 29 wherein said outside computer and said agent station are programmed to establish screen sharing between said agent station and said outside computer over the internet.

44. The apparatus of claim 29 wherein there are a plurality of call routers that each have associated agent stations connected to said telephone network, and wherein said request for an available agent is communicated from said server as an offer message to said plurality of call routers.

45. The apparatus of claim 29 wherein said available agent station is adapted to send a message to said call router indicating that a call is coming in from said outside telephone, and said call router is adapted to send a message to said agent station authorizing said agent station to receive said call.

46. The apparatus of claim 29 wherein said agent station is an automated attendant.

47. The apparatus of claim 29 said call router also identifies an alternative non-agent station resource to handle a further request for a telephone call with an agent station, and said server sends further signals to permit establishing a telephone call from said outside telephone to a said non-agent station resource.

48. The apparatus of claim 47 wherein said non-agent station resource is a member of the group consisting of a voice mail post office box and an automated call distributor that is different than said call router.

* * * * *